(12) United States Patent
Kuhnen et al.

(10) Patent No.: US 6,308,158 B1
(45) Date of Patent: Oct. 23, 2001

(54) DISTRIBUTED SPEECH RECOGNITION SYSTEM WITH MULTI-USER INPUT STATIONS

(75) Inventors: Regina Kuhnen, Trumbull; Channell Larossa-Greene, Bridgeport; Simon L. Howes, Monroe, all of CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

(21) Appl. No.: 09/345,588

(22) Filed: Jun. 30, 1999

(51) Int. Cl.[7] ............................. G10L 15/00; G10L 21/00
(52) U.S. Cl. ........................ 704/275; 704/235; 707/530
(58) Field of Search .................................. 704/246, 251, 704/270, 276, 275, 235; 345/329; 707/530

(56) References Cited

U.S. PATENT DOCUMENTS

| | | | |
|---|---|---|---|
| 5,165,095 | * 11/1992 | Borcherding | 379/88 |
| 5,721,827 | * 2/1998 | Logan et al. | 395/200.47 |
| 5,732,216 | * 3/1998 | Logan et al. | 395/200.33 |
| 5,799,273 | * 8/1998 | Mitchell et al. | 704/235 |
| 5,893,064 | * 4/1999 | Kudirka et al. | 704/275 |
| 5,953,700 | * 9/1999 | Kanevsky et al. | 704/246 |
| 6,078,566 | * 6/2000 | Kikinis | 370/286 |
| 6,173,259 | * 1/2001 | Bijl et al. | 704/235 |

* cited by examiner

*Primary Examiner*—Richemond Dorvil
*Assistant Examiner*—Susan McFadden
(74) *Attorney, Agent, or Firm*—Kramer Levin Naftalis & Frankel LLP; Gregor N. Neff, Esq.

(57) ABSTRACT

A central dictation system includes a central server computer and a plurality of voice input stations connected to the server computer. Speaker-dependent speech recognition capabilities are provided at each voice input station, and any authorized user may use any station. When a user logs on to one of the stations, acoustic reference files to be used in recognizing the speech of the user are downloaded from the server to the station onto which the user has logged on. The down-loaded acoustic reference files are used to perform the speech recognition at the voice input station. A high bandwidth signal generated at the voice input station and used for speech recognition processing is transcoded at the input station to form a low bandwidth speech signal. The low bandwidth speech signal and the text document resulting from the speech recognition process are uploaded to the server computer.

20 Claims, 4 Drawing Sheets

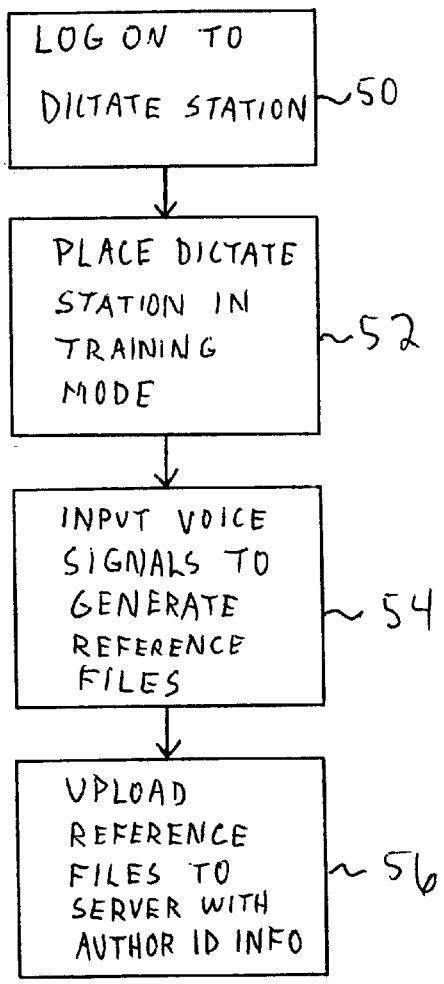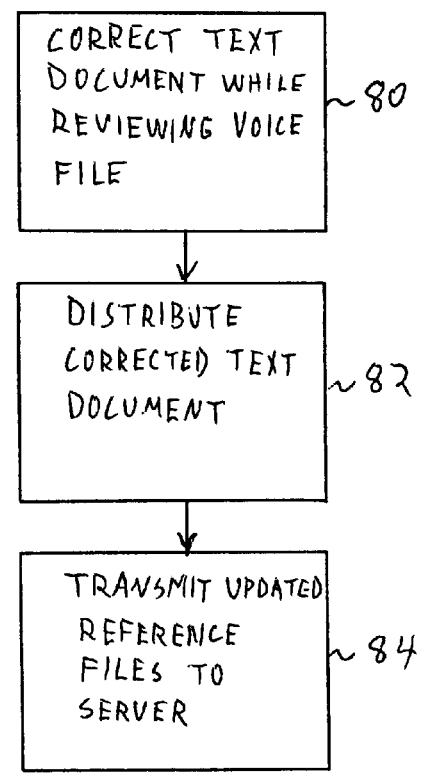

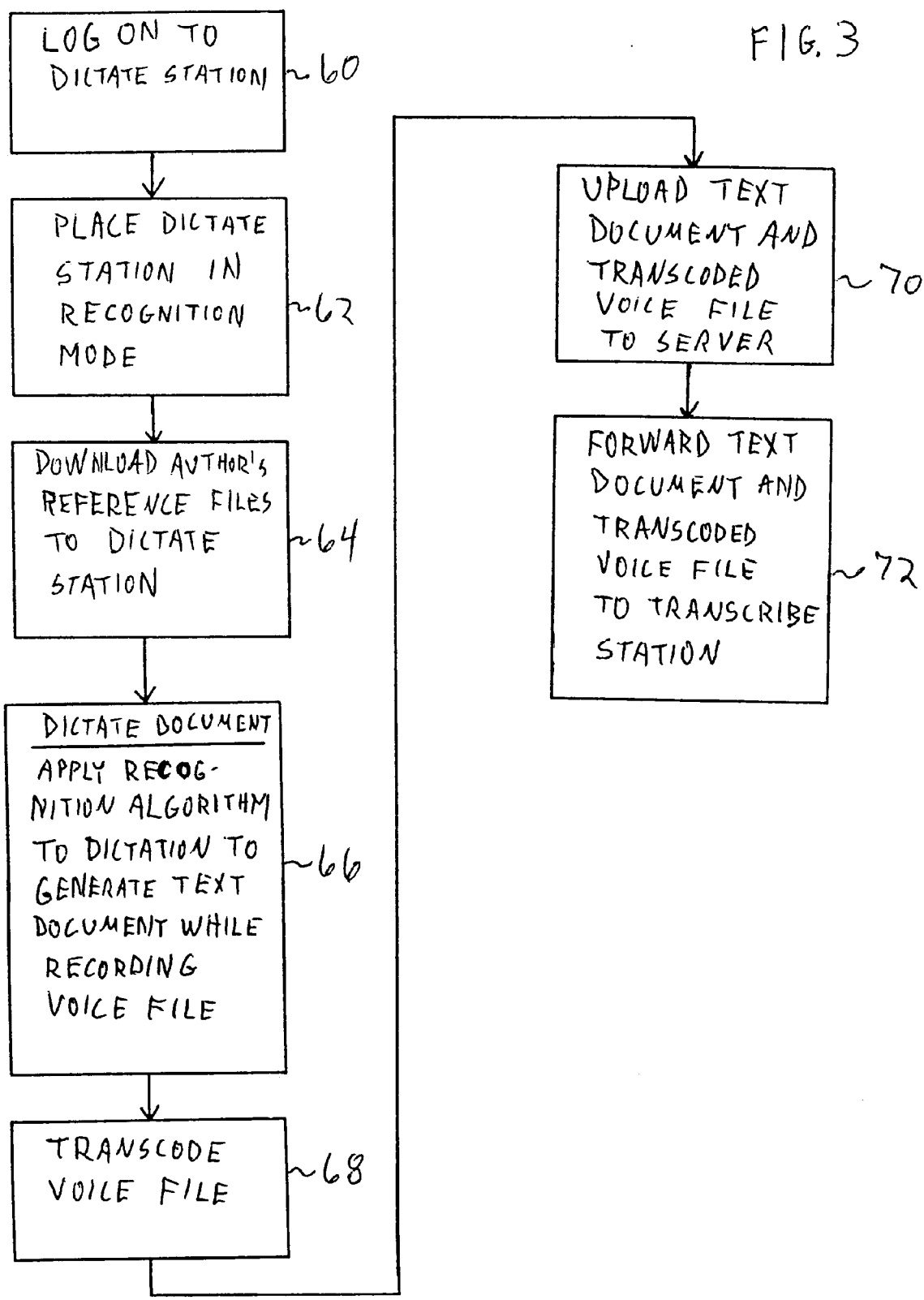

DISTRIBUTED SPEECH RECOGNITION SYSTEM WITH MULTI-USER INPUT STATIONS

FIELD OF THE INVENTION

The present invention relates to document creation systems and, more particularly, to such systems in which speech recognition is performed to convert speech signals into text documents.

BACKGROUND OF THE INVENTION

Recent years have seen significant advances in practical applications of continuous speech recognition (CSR). For example, it is now possible to purchase commercially available CSR application software packages suitable for installation and use in a conventional personal computer for home or office.

It has also been proposed to provide CSR as an additional feature of conventional central dictation systems.

Known central dictation systems take a number of forms. In one typical variety of central dictation system, which is frequently used in hospitals, the hard disk drive or drives of a server computer is used as the central voice recording device. Dictate stations are provided at a number of locations in the hospital to permit physicians to dictate directly onto the central recorder. The dictate stations may be in the form of hand microphones or telephone-style handsets, and are connected by analog or digital signal paths to the central recorder. The dictate stations customarily include control switches which allow the authors to control conventional dictation functions, such as record, stop, rewind, fast forward, play, etc. In addition, the dictate stations typically include a keypad and/or bar code reader to permit the author to enter data to identify himself or herself as well as the patient to whom the dictated material is related.

Typical central dictation systems also include a number of transcription stations connected to the central recorder. The transcription stations commonly include a personal computer which runs a word processing software package, as well as listening and playback-control devices which allow the transcriptionist listening access to voice files stored in the central recorder and control over playback functions. Dictation jobs awaiting transcription in the central recorder are assigned to transcriptionists according to conventional practices.

It has been proposed to incorporate CSR functions in the central recorder/server of a central dictation system. The CSR function is applied at the server to a dictation file to generate a text document, and then the text document and voice file are made available to transcriptionists who edit and correct the text while reviewing the voice files. The preprocessing of the voice files by CSR can be expected to produce significant improvements in productivity for the transcription function.

In a prior co-pending patent application Ser. No. 09/099, 501, which is commonly assigned with the present application and entitled "Dictation System Employing Computer-To-Computer Transmission of Voice Files Controlled by Hand Microphone", it was proposed to provide a central dictation system utilizing networked computers. According to this proposal, some of the networked computers have hand microphones interfaced thereto and constitute dictation stations, whereas others of the networked personal computers have headsets and foot pedals interfaced thereto and constitute transcription stations. The e-mail system of the computer network is used to transport voice files from the dictation stations and to the transcription stations. In addition, the e-mail system may be used to forward dictation files into a central dictation recorder, from which transcriptions can play back the dictation files.

It would be desirable to implement CSR functions in a central dictation system in a manner which increases capacity of the system and lessens burdens on the central recorder/server. It would also be desirable to provide an all-digital system in which the transmission bandwidth of the system is not unduly burdened.

OBJECTS AND SUMMARY OF THE INVENTION

It is an object of the invention to provide a central dictation system in which continuous speech recognition processing is employed.

It is a further object of the invention to provide a central dictation system which makes speaker-independent CSR available at all input stations, while minimizing burdens upon transmission facilities and the central server computer of the system.

According to an aspect of the invention, there is provided a method of operating a document creation system, the system including a plurality of voice input stations and a server computer connected to exchange data signals with the voice input stations, the method including the steps of logging on to one of the voice input stations; placing the one of the voice input stations in a training mode for training a speech recognition algorithm; dictating into the one of the voice input stations to generate speech signals; analyzing the speech signals to generate acoustic reference files; and uploading the acoustic reference files to the server computer.

According to further aspects of the invention, the logging-on step includes inputting ID data for identifying a person who is performing the logging-on step, and the method further includes the step of uploading the ID data to the server together with the acoustic reference files.

According to further aspects of the invention, the method further includes second logging-on to a second one of the voice input stations, the second logging-on step including inputting author ID data for identifying an author who is performing the second logging-on step, the author being the person who performed the logging-on step previously referred to in connection with the training mode; transmitting to the server computer the author ID data inputted in the second logging-on step; in response to the transmitting step, downloading from the server computer to the second one of the voice input stations the acoustic reference files uploaded to the server computer in the uploading step; dictating into the second one of the voice input stations to generate second speech signals; and applying a speech recognition algorithm to the second speech signals at the second one of the voice input stations by using the downloaded acoustic reference files, to generate text document data from the second speech signals.

According to still further aspects of the invention, the second speech signals are digital signals generated at a first data rate, and the method of the present invention further includes transcoding the second speech signals to form transcoded speech signals which have a second data rate which is lower than the first data rate. For example, the first data rate is preferably on the order of 22 kilobytes per second, which is high enough to support satisfactory performance of the speech recognition algorithm. After or in parallel with the speech recognition processing, the speech signals are transcoded down to, say, one kilobyte per second. At the lower data rate, although some fidelity is lost, the sound quality is still adequate for the purposes of audibly reviewing the transcoded voice file. The transcoded voice file is uploaded to the server computer along with the text document created by applying the voice recognition algorithm to the high bandwidth speech signals.

According to other aspects of the invention, the document creation system includes a plurality of document review stations (which may also be regarded as transcription stations). The method of the invention preferably includes downloading the transcoded speech signals, the text document data and author ID data from the server computer to one of the document review stations to which a particular dictation job has been assigned. The text document is then edited and corrected at the document review station by the transcriptionist, who audibly plays back and reviews the transcoded speech signals and compares the text document which resulted from the speech recognition algorithm with the transcoded speech signals.

According to another aspect of the invention, there is provided a central dictation system, including a server computer, a plurality of voice input stations, and a data communication network connecting the voice input stations to the server computer. Further in accordance with this aspect of the invention, the voice input stations, which are preferably constituted by personal computers having hand microphones interfaced thereto, are programmed to perform speech recognition with respect to speech signals inputted into the voice input stations, where the speech recognition is performed on the basis of acoustic reference files downloaded to the voice input stations from the server computer. Preferably the voice input stations also are programmed to transcode the speech signals inputted into the voice input stations from a first data rate to a second data rate which is lower than the first data rate, and the transcoded speech signals are uploaded from the voice input stations to the server computer along with text documents created at the voice input stations by application of speech recognition at the voice input stations.

According to further aspects of the invention, the central dictation system includes a plurality of document review stations connected to the server computer by the data communication network; and text documents created by the speech recognition performed at the voice input stations are downloaded along with the transcoded speech signals from the server to document review stations.

The central dictation system and document creation method, as provided in accordance with the invention and summarily described above, allows every author to use every one of the voice input stations and provides speaker-independent speech recognition processing at each of the input stations. Consequently, the central server is not burdened by speech recognition processing, and the capacity of the system, in terms of number of authors who may be simultaneously served, may be the same as the number of voice input stations. This is in contrast to previously proposed systems, in which the number of authors who could be served simultaneously by speech recognition processing was relatively few, being limited by the processing capacity of the central server. Furthermore, because the high bandwidth speech signals required for satisfactory speech recognition processing need not be transmitted to the central system, only low bandwidth (transcoded) speech signals are transmitted, thereby minimizing burdens on the transmission bandwidth of the system.

Other objects, features and advantages of the invention will become apparent from the subsequent more detailed description of preferred embodiments.

BRIEF DESCRIPTION OF THE DRAWINGS

FIG. 2 illustrates in the form of a flow-chart a training function for CSR provided in accordance with the invention.

FIG. 3 is a flow-chart illustration of a process according to which CSR is performed in the system of FIG. 1.

FIG. 4 is a flow-chart which illustrates a process for reviewing and correcting text documents in the system of FIG. 1.

DESCRIPTION OF PREFERRED EMBODIMENTS

Figure 1:
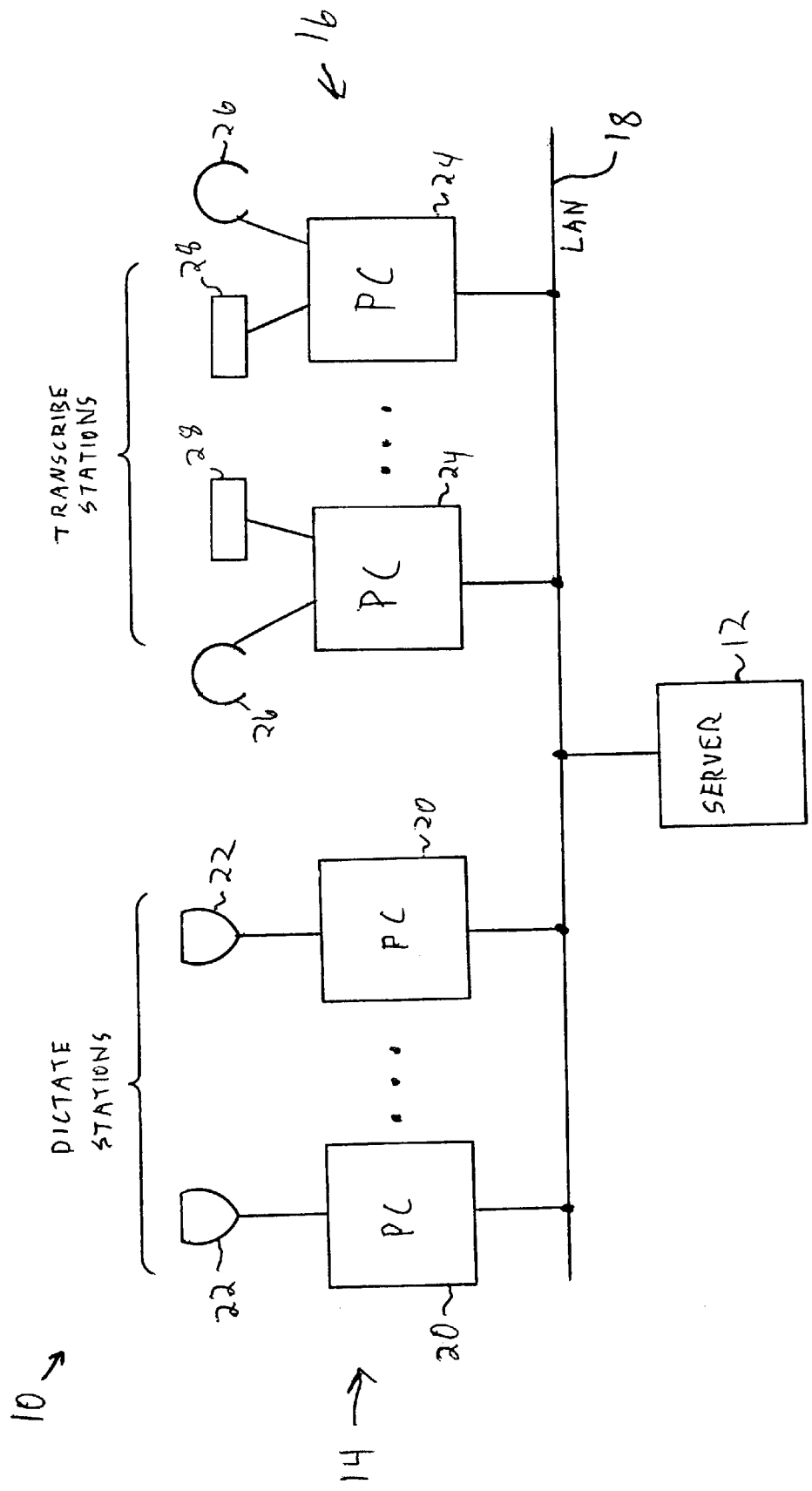
FIG. 1 is a schematic representation of a central dictation system provided in accordance with the invention.

A preferred embodiment of the invention will now be described, initially with reference to FIG. 1. In FIG. 1, reference numeral 10 generally indicates a central dictation system provided in accordance with the invention. The major components of the central dictation system 10 are a central server computer 12, voice input (dictation) stations 14, document review (transcription) stations 16, and a data communication network 18 which connects the voice input stations 14 and the document review stations 16 to the server 12.

All of the components shown in FIG. 1 may be constituted by standard hardware. Preferably the communication network 18 is a conventional local area network (LAN). The voice input stations 14 are each preferably constituted by a conventional personal computer 20 which runs both known software packages as well as software provided in accordance with the invention. Each of the voice input stations 14 also includes a hand microphone 22 which is interfaced to the respective PC 20 to permit input of voice signals into the PC 20. The hand microphones 22 may be of the type commercially marketed by the assignee of the present application under the trademark "BOOMERANG".

Each of the document review stations 16 also preferably includes a conventional PC (reference numerals 24). Interfaced to each of the PC's 24 is a headset 26 and a foot pedal 28. As is well known to those who are skilled in the art, the foot pedals 28 permit the transcriptionist to control playback functions of a voice file that is being reviewed by the transcriptionist, and the headsets 26 include small speakers or ear plugs which permit the transcriptionist to hear the audible reproduction of the voice file under review. Both the headsets 26 and the foot pedals 28 made be of the types commercially marketed by the assignee of the present invention under the trademark "BOOMERANG".

It should be understood that each of the PC's 20 and 24 also include other peripheral devices not separately shown in FIG. 4. These peripherals may include a display, a keyboard, a mouse and a barcode reader. The PC's should also include a conventional sound card such as is installed in many of the personal computers that are now commercially available.

Figure 1A:
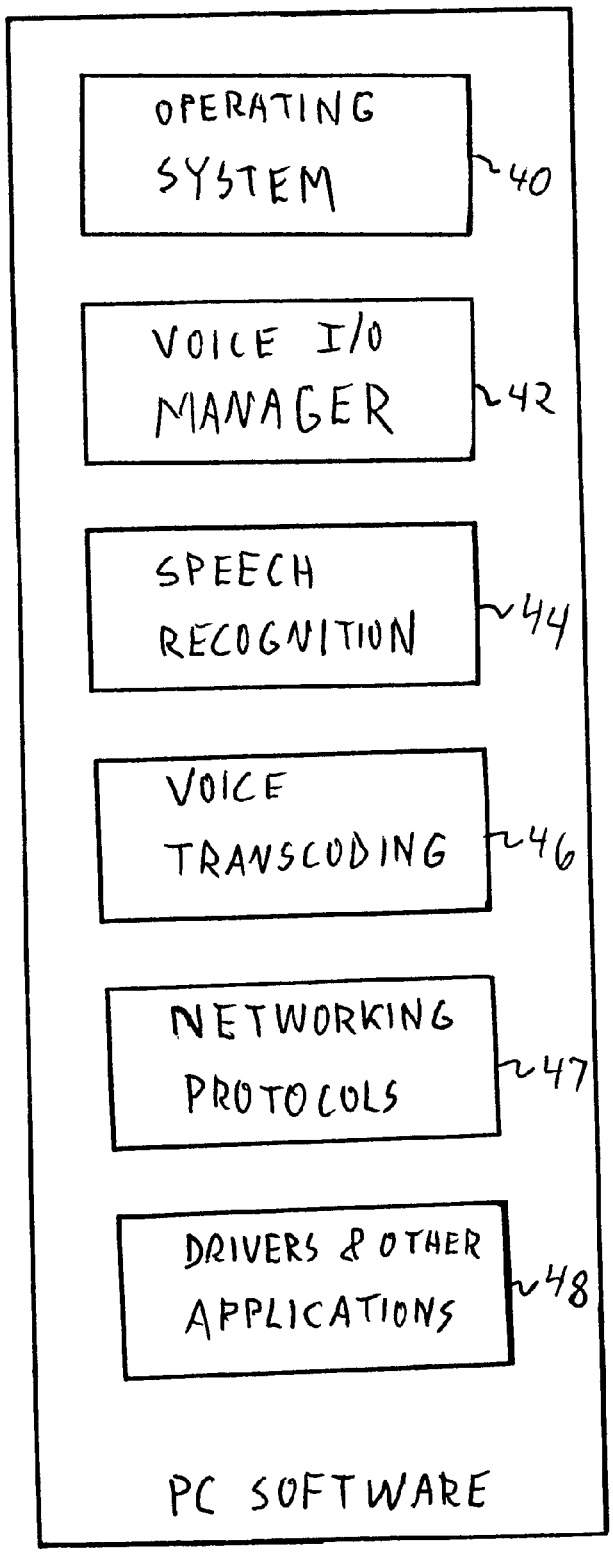
FIG. 1A schematically illustrates software loaded in personal computers which are utilized as dictation stations in the system of FIG. 1.

FIG. 1A is a schematic representation of software which is loaded into and controls operation of the PC's 20.

The software for the PC's 20 include operating system software 40, which may be a conventional operating system such as Windows NT. The software loaded in the PC's 20 also includes a program 42 which manages input and recording of speech signals dictated into the hand microphone 22. The program 42 also manages storage of speech signals as voice files in the PC 20 as well as reproduction of the voice files.

Another software package stored in the PC 20 is a speech recognition package 44. The speech recognition software 44 may be any one of a number of conventional CSR packages. Another program loaded in the PC's 20 is a speech transcoding application 46 which carries out a bandwidth-reduction algorithm with respect to the speech signals stored in the PC 20.

Reference numeral 47 indicates software in the PC 20 which enables it to interface properly with the local area network 18, and reference numeral 48 represents other software loaded in the PC 20, such as conventional device driver software, and other applications which run on the PC 20.

The software installed in the PC's 24 of the document review stations 16 may be similar to that illustrated in FIG. 1A, except that no voice transcoding software is required in the PC's 24, and the "other applications" represented by reference numeral 48 preferably include a word processing software application.

The administrative server computer is programmed to perform the conventional functions carried out by the central computer of a central dictation system. In addition, the server computer carries out additional functions which are described below.

Operation of the system of FIG. 1 for the purpose of initializing or "training" the speech recognition capabilities of the system will now be described with reference to FIG. 2.

In an initial step 50 of FIG. 2, an individual who is an authorized user of the system, but for whom the speech recognition capabilities have not yet been initialized, logs onto one of the voice input stations 14. As will be understood by those of ordinary skill in the art, the log-in process preferably includes entry of data which identifies the user, and may also include entry of a password and/or another step for verifying the user's identity or authorization to use the system. Thus, instead of or in addition to entering a password, other security measures such as a biometric scan or use of an access card may be required.

The voice input stations 14 may be arranged so that the speech recognition application 44 is automatically invoked upon completion of a log-in procedure; alternatively, the speech recognition program may be available to be invoked by the user upon completion of log-in. In either case, it will be assumed for the purposes of FIG. 2 that the speech recognition application is invoked. The user then has the option of placing the speech recognition program in a "training" mode, which is done according to step 52 in FIG. 2. The user is then instructed by the voice input station 14 to dictate predetermined text into the hand microphone 22. The text to be dictated may conveniently be displayed on a display screen (not separately shown) of the PC 20, as is done when training conventional CSR software. As the user dictates into the microphone 22, the PC 20, running the speech recognition software, stores and analyzes the resulting voice signals to generate files which are indicative of the results of the analysis of the user's speech. This analysis is performed in accordance with conventional practices for speech recognition algorithms, and the resulting files are customarily referred to as "acoustic reference files." The generation of such files is indicated at step 54 in FIG. 2.

Following step 54 is step 56. At step 56 the acoustic reference files generated at the voice input station in step 54 are uploaded from the voice input station to the central server, together with information which identifies the author who performed the training procedure. The uploaded acoustic reference files are then stored in the server and are indexed according to the author identifying information.

FIG. 3 is a flow chart which illustrates operation of the central dictation system of FIG. 1 in connection with dictation and voice recognition processing of a document dictated by an author.

According to a first step 60 in FIG. 3, an author logs on to one of the voice input stations. The voice input station to which the author logs on need not be the same as the station which the author had previously used to carry out the CSR training procedure. That is, the voice input station may be any one of the voice input stations included in the system 10.

After the log-on process is complete, the speech recognition application is invoked, either automatically or by action of the author. The author then places the voice input station in a mode to carry out speech recognition of voice input to be dictated by the author (step 62). The voice input station then communicates with the server computer to request downloading of the acoustic reference files for the author which had previously been stored in the server computer, and the acoustic reference files are downloaded from the server computer to the voice input station to which the author logged on at step 60 (step 64). Alternatively, the downloading of the acoustic reference files may occur automatically during or upon completion of the log-on process, and before the recognition software is invoked or placed in recognition mode.

Following step 64 is step 66, at which the author proceeds to dictate into the hand microphone of the voice input station in order to create a document. Although not separately indicated in step 66, the author may also use conventional practices to identify the subject matter of the document. For example, a bar code on a patient's chart may be scanned by a bar code reader to enter data which indicates that the document to be dictated relates to the patient in question.

As the author dictates into the hand microphone, the resulting analog electrical signal is converted into a digital speech signal at a data rate that is sufficiently high to permit satisfactory application of the speech recognition algorithm to be carried out by the speech recognition software. According to a preferred embodiment of the invention, the speech recognition software is either one of the speech recognition packages provided by Philips Electronics or IBM (the latter being distributed under the trademark "Via Voice"). For proper operation of those speech recognition software packages, a data rate of 22 kilobytes per second is appropriate. The resulting high bandwidth digitized speech signals are processed by the speech recognition algorithm to generate a text document. At the same time, the high bandwidth speech signals are stored in the mass storage device of the voice input station. When the author indicates that dictation of the document is complete, the high bandwidth signal is transcoded by a conventional technique to yield a low bandwidth signal (step 68). For example, the low bandwidth signal may have a data rate of 1 kilobyte/sec, in compliance with the well known "True Speech" standard.

Following step 68 is step 70. At step 70, the voice input station uploads to the server computer both the text document generated at step 66 and the transcoded (low bandwidth) digital speech signals generated at step 68. The text document and the speech signals may also be retained at the voice input station, or may be deleted from the mass storage device of the voice input station.

It will be noted that the total quantity of data to be transmitted from the voice input station to the server computer is relatively low, since only the low bandwidth speech signals, and not the originally recorded high bandwidth speech signals, are transmitted to the server together with the text document. Of course, the text document itself typically consists of a rather small quantity of data, on the order of one kilobyte per page.

At this point, both the low bandwidth digital speech signals and the unedited text document may be made available for review by authorized users of the system. In addition, the text document and the low bandwidth speech signals are transmitted from the server computer to one of the document review stations 16, either immediately upon uploading of those items to the server, or at a subsequent time when the task of reviewing and editing the text document is assigned to a transcriptionist who uses the document review station (step 72).

FIG. 4 is a flow chart which illustrates a process for editing the text document which was downloaded to the text document review station at step 72 of FIG. 3.

As indicated in step 80 of FIG. 4, the transcriptionist causes the downloaded low bandwidth speech signals to be played back and reviews the reproduced speech while also reviewing the text document and making such corrections to the text document as are required. The main purpose of this step is for the transcriptionist to detect and correct errors made by the CSR software in creating the text document. The transcriptionist does this by listening to the reproduced low bandwidth speech signals and comparing them to the text document. The transcriptionist corrects the text document so that it matches the speech signals dictated by the author.

When the transcriptionist has finished editing the text document, the resulting corrected text document is then transmitted back to the server 12 for distribution to the intended recipients. (step 82).

In addition, suitable speech recognition software at the document review station notes the corrections made by the transcriptionists, compares the corrections with corresponding speech signals and generates updated acoustic reference files. These updated acoustic reference files are then uploaded to and stored in the server computer. By updating the author's acoustic reference files, subsequent performance of the speech recognition function for that author is improved.

In the document creation/central dictation system described above, and provided in accordance with the invention, speaker-dependent speech recognition processes are made available at each one of voice input stations included in the system. The speech recognition process is carried out by the voice input station itself, so that the processing requirements for speech recognition do not burden the server computer. Any author may use any one of the voice input stations, because the acoustic reference files for the author are downloaded as required from the central server to the voice input station currently in use by the author. Digital speech signals are initially generated at a high bandwidth data rate that is suitable for speech recognition processing. Before the speech signals are transmitted within the dictation system, the signals are transcoded to a low bandwidth data rate that is adequate for subsequent audible review of the voice file but does not unduly burden the data transmission capacity of the system.

Although the foregoing description assumes that the author's speech signals were inputted into the voice input stations via a hand microphone included in the voice input station, there are alternative possibilities. For example, the author's dictation may be telephoned in to the voice input station. The speech signal provided to the voice input station may be either analog or digital. As another alternative, the dictation may initially be dictated into a separate recorder such as a portable recorder which utilizes a digital memory card as a recording medium. The dictation may then be transferred to the voice input station by interfacing the portable recorder to the voice input station, or by interfacing the digital memory card itself to the voice input station.

It is preferred that, as discussed above, the "training" of the CSR software be performed at the voice input stations. However, it is also within the contemplation of the invention that training of the CSR software be performed by the server computer on the basis of high bandwidth speech signals transmitted from a voice input station.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A method of operating a document creation system, the system including a plurality of voice input stations and a server computer connected to exchange data signals with the voice input stations, the method comprising the steps of:

storing speech recognition software at one of the voice input stations;

logging on to said one of the voice input stations;

placing said one of the voice input stations in a training mode for training a speech recognition algorithm included in the stored speech recognition software;

dictating into said one of the voice input stations to generate speech signals;

analyzing the speech signals at the voice input station using the stored speech recognition software in the training mode to generate acoustic reference files applicable to a particular user; and uploading the acoustic reference files from the voice input station to the server computer.

2. A method according to claim 1, wherein the logging-on step includes inputting I.D. data for identifying a person who is performing the logging-on step; and further comprising the step of uploading the I.D. data to the server together with the acoustic reference files.

3. A method according to claim 2, further comprising the steps of:

second logging on to a second one of the voice input stations, said second logging-on step including inputting author I.D. data for identifying an author who is performing the second logging-on step, said author being the person who performed the logging-on step referred to in claim 2;

transmitting to the server computer the author I.D. data inputted in said second logging-on step; in response to said transmitting step, downloading from the server computer to the second of the voice input stations the acoustic reference files uploaded to the server computer in said uploading step;

dictating into said second one of the voice input stations to generate second speech signals; and applying a speech recognition algorithm to the second speech signals at the second one of the voice input stations by using the downloaded acoustic reference files, to generate text document data from the second speech signals.

4. A method according to claim 3, wherein said second speech signals are digital signals generated at a first data rate, the method further comprising the step of transcoding the second speech signals to form transcoded speech signals which have a second data rate which is lower than the first data rate.

5. A method according to claim 4, wherein the second data rate is not more than one-tenth the first data rate.

6. A method according to claim 4, further comprising the step of uploading the transcoded speech signals, the text document data and the author I.D. data from said second one of the voice input stations to the server computer.

7. A method according to claim 6, wherein the document creation system further includes a plurality of document review stations, and the method further comprises downloading the uploaded transcoded speech signals, text document data and author I.D. data from the server computer to one of the document review stations.

8. A method according to claim 7, further comprising the steps of:

reviewing the downloaded speech signals and text document data at the document review stations;

correcting the downloaded text document data at the document review stations; and uploading the corrected text document data to the server computer.

9. A method according to claim 8, further comprising the step of updating the acoustic reference files in the server computer on the basis of said step of correcting the text document data at the document review stations.

10. A method according to claim 3, further comprising the steps of uploading the text document data from said second one of the voice input stations to the server computer.

11. A method according to claim 1, wherein each of the voice input stations comprises a personal computer and a microphone interfaced to the personal computer.

12. A method of generating a text document, comprising the steps of:

logging on to a voice input station connected to a server computer;

downloading acoustic reference files from the server computer to the voice input station, the downloaded acoustic reference files having been generated in a speech recognition training mode and being applicable to a particular author;

dictating into the voice input station to generate a voice data file; and applying a speech recognition algorithm to the voice data file at the voice input station by using the downloaded acoustic reference files to generate a text document.

13. A method according to claim 12, further comprising the step of uploading the text document to the server computer.

14. A method according to claim 13, wherein the voice data file is generated at a first data rate at said dictating step, and further comprising the steps of:

transcoding the voice data file from the first data rate to a second data rate which is lower than the first data rate; and uploading the transcoded voice data file to the server computer.

15. A method of generating a text document, comprising the steps of:

dictating into a voice input station to generate a voice data file, the voice input station connected to a server computer, the voice data file being generated at a first data rate;

applying a speech recognition algorithm to the voice data file at the voice input station to generate a text document;

transcoding the voice data file at the voice input station from the first data rate to a second data rate which is lower than the first data rate; and uploading the text document and the transcoded voice data file from the voice input station to the server computer.

16. A central dictation system comprising:

a server computer;

a plurality of voice input stations; and a data communication network connecting the voice input stations to the server computer;

wherein the voice input stations are programmed to generate text documents by performing speech recognition with respect to speech signals inputted into the voice input stations, said speech recognition being performed by using acoustic reference files downloaded to the voice input stations from the server computer, the downloaded acoustic reference files having been generated in a speech recognition training mode and being applicable to a particular author.

17. A central dictation system according to claim 16, further comprising a plurality of document review stations connected to said server computer by said data communication network; and wherein text documents created by said speech recognition performed by said voice input stations are uploaded from said voice input stations to said server computer and downloaded from said server computer to said document review stations.

18. A central dictation system according to claim 17, wherein said voice input stations are further programmed to transcode said speech signals inputted into the voice input stations from a first data rate to a second data rate which is lower than the first data rate, the transcoded speech signals being uploaded from the voice input stations to the server computer and being downloaded from the server computer to the document review stations.

19. A central dictation system according to claim 18, wherein said first data rate is at least ten times higher than said second data rate.

20. A central dictation system according to claim 16, wherein each of said voice input stations includes a personal computer and a hand microphone connected to the personal computer.

* * * * *